United States Patent
Peng et al.

(10) Patent No.: US 8,526,191 B2
(45) Date of Patent: Sep. 3, 2013

(54) ASSEMBLY APPARATUS AND ELECTRONIC DEVICE USING THE SAME

(75) Inventors: Wen-Tang Peng, Tu-Cheng (TW); Guang-Yi Zhang, Shenzhen (CN); Zhe Zhang, Shenzhen (CN); Bing-Bao Guo, Shenzhen (CN)

(73) Assignees: Hong Fu Jin Precision (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 462 days.

(21) Appl. No.: 12/980,300

(22) Filed: Dec. 28, 2010

(65) Prior Publication Data
US 2012/0020029 A1    Jan. 26, 2012

(30) Foreign Application Priority Data
Jul. 21, 2010    (CN) .......................... 2010 1 0232814

(51) Int. Cl.
*H05K 5/00*    (2006.01)
(52) U.S. Cl.
USPC ................. 361/756; 361/679.39; 361/679.58; 361/727; 312/332.1; 312/333; 206/701

(58) Field of Classification Search
USPC ....... 361/756, 727; 312/332.1, 333; 206/701
See application file for complete search history.

(56) References Cited

U.S. PATENT DOCUMENTS
5,586,003 A * 12/1996 Schmitt et al. ........... 361/679.58

* cited by examiner

*Primary Examiner* — Zachary M Pape
*Assistant Examiner* — Douglas Burtner
(74) *Attorney, Agent, or Firm* — Altis Law Group, Inc.

(57) ABSTRACT

An assembly apparatus includes a linkage member defining a first front sliding groove and a first rear sliding groove and a sliding member movably connected to the linkage and defining a second front sliding groove and a second rear sliding groove. The first front sliding groove corresponds to the second front sliding groove, and the first rear sliding groove corresponds to the second rear sliding groove. The assembly apparatus further includes a fixing base defining a curved groove, a control member including a first rotation pin and a second rotation pin, and a fixing pin fixed with respect to the fixing base. The first rotation pin is slidably received in the first and second rear sliding groove, the second rotation pin is slidably received in the curved groove, and the fixing pin is slidably received in the first and second front sliding groove.

18 Claims, 4 Drawing Sheets

ASSEMBLY APPARATUS AND ELECTRONIC DEVICE USING THE SAME

BACKGROUND

1. Technical Field

The present disclosure relates to an assembly apparatus and an electronic device utilizing the assembly apparatus.

2. Description of Related Art

With improvement in performance, electronic devices, such as server systems, require a plurality of function modules, for example, data storage modules and power supply modules. Generally, these function modules provide good performance and have larger dimensions. These functional modules are electrically connected to the motherboard of the electronic device via a plurality of connectors. However, it is inconvenient to assemble and disassemble the larger function modules because the function modules are larger and heavier. When the function modules are disassembled inappropriately, the connectors and the motherboard may be damaged.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

One embodiment of an electronic device is a server and includes a housing, a motherboard received in the housing, one or more function modules electrically connected to the motherboard via a plurality of connectors, and an assembly apparatus for mounting the function modules. The function modules can be data storage units, power supply units, and the like. The housing, the motherboard, the functional modules, and the connectors are known to those skilled in the art, and thus are not shown.

Figure 1:
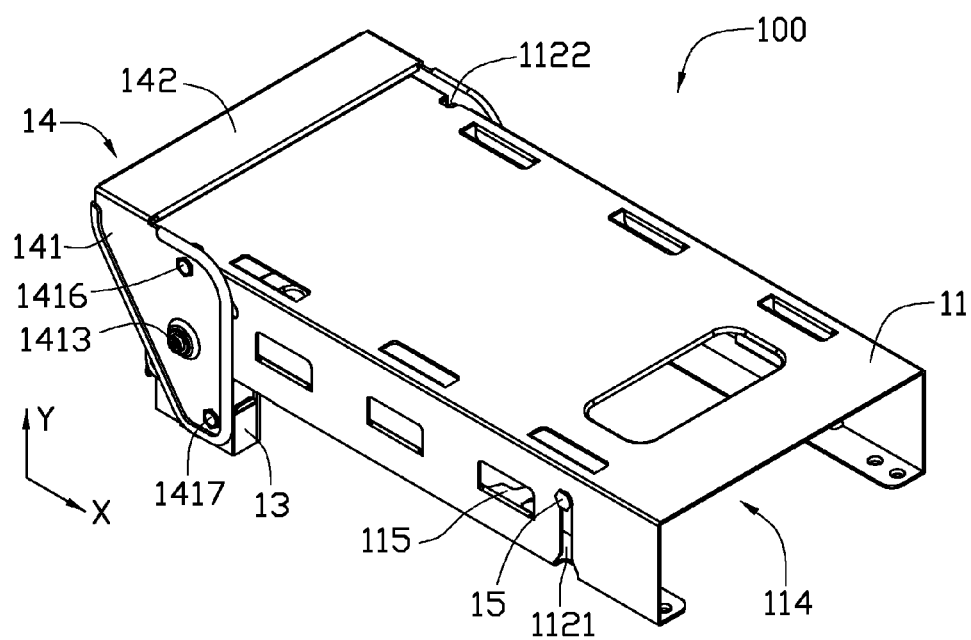
FIG. 1 is an isometric view of one embodiment of an assembly apparatus.
Figure 2:
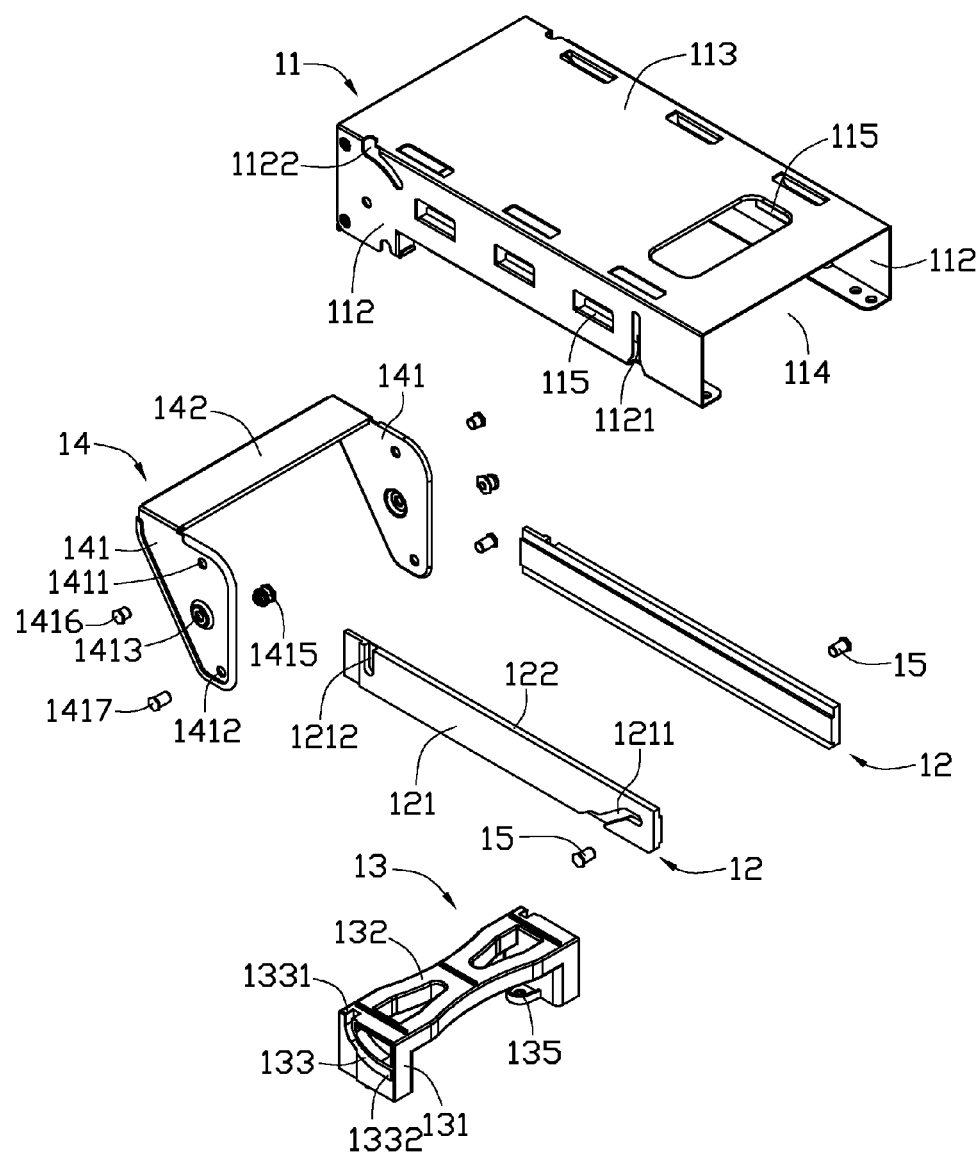
FIG. 2 is an exploded, isometric view of the assembly apparatus of FIG. 1.
Figure 3:
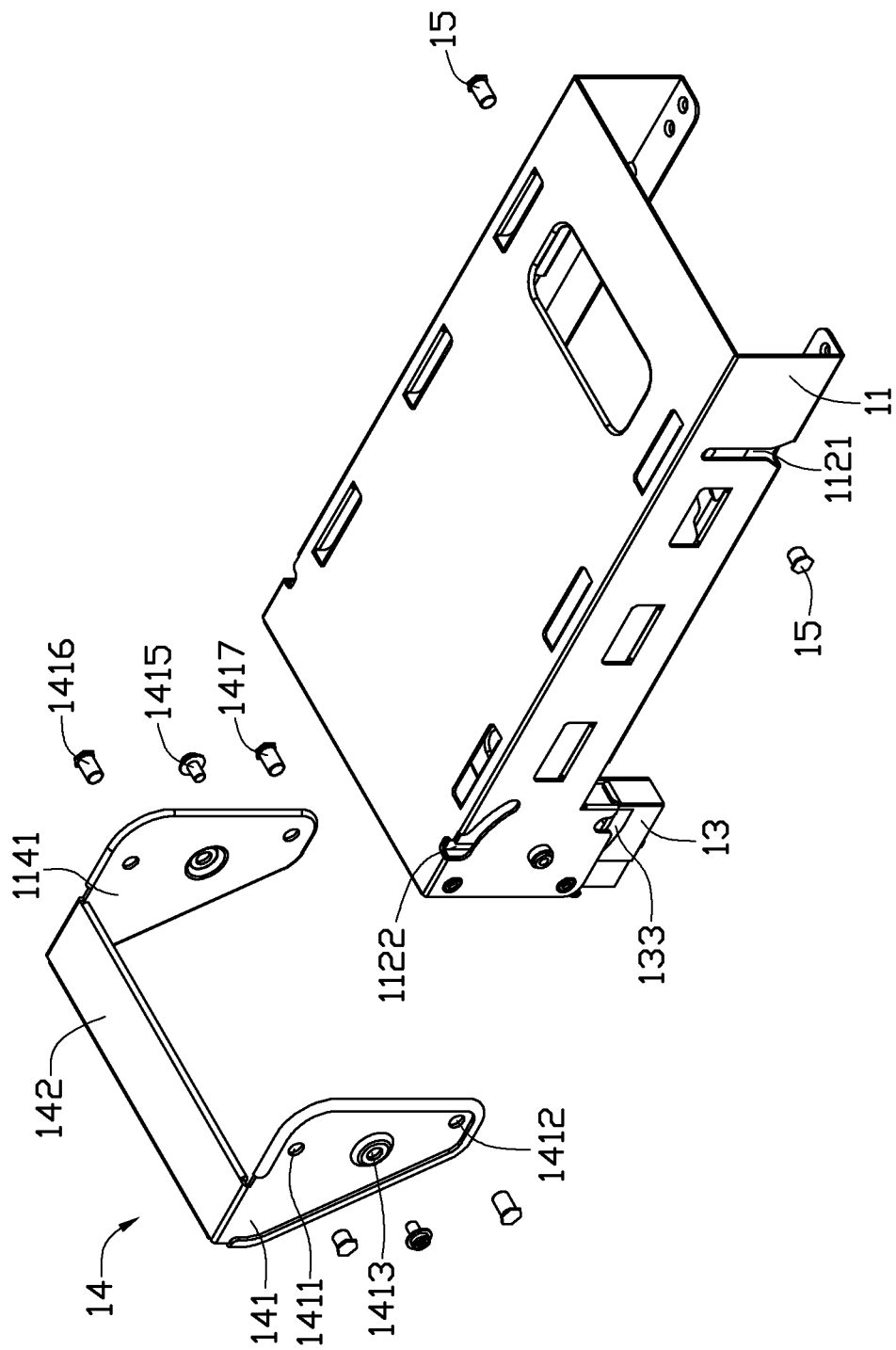
FIG. 3 is similar to FIG. 2, but viewed from another aspect.

Referring to FIGS. 1 through 3, one embodiment of an assembly apparatus 100 includes a linkage member 11, two sliding members 12, a fixing base 13, a control member 14, and two fixing pins 15. The function modules are received in the linkage member 11, and the fixing base 13 is fixed on the motherboard. The fixing pins 15 are fixed with respect to the fixing base 13, for example, fixed to a mounting plate secured in the housing.

The linkage member 11 is substantially U-shaped and includes opposite sidewalls 112 and a connecting wall 113 connecting the sidewalls 112. The sidewalls 112 and the connecting wall 113 cooperatively define a chamber 114 for receiving the function modules. A plurality of L-shaped support plates 115 are formed on inner sides of the sidewalls 112. The support plate 115 and the corresponding sidewall 112 cooperatively define a guide groove (not shown).

Each sidewall 112 defines a first front sliding groove 1121 adjacent to the front end thereof, and a first rear sliding groove 1122 adjacent to the rear end thereof. The first front sliding groove 1121 and the first rear sliding groove 1122 extend along different axes. The first front sliding groove 1121 extends from the bottom of the sidewall 112 along a Y axis. The first rear sliding groove 1122 extends from the top of the sidewall 112 in a curve toward the first front sliding groove 1121.

Each sliding member 12 is a longitudinal strip slidably received in the guide groove of the linkage member 11. The sliding member 12 includes a first sidewall 121 facing the sidewall 112 of the linkage member 11, and a second sidewall 122 opposite to the first sidewall 121. The first sidewall 121 defines a second front sliding groove 1211 and a second rear sliding groove 1212. The second front sliding groove 1211 and the second rear sliding groove 1212 extend along different axes. The second front sliding groove 1211 extends from the bottom of the sliding member 12 and is angled with respect to the Y axis. The second rear groove 1212 extends from the top of the sliding member 12. The first front sliding groove 1121 corresponds to the second front sliding groove 1211, and the first rear sliding groove 1122 corresponds to the second rear sliding groove 1212.

The fixing base 13 is substantially U-shaped and fixed to the motherboard and positioned beneath the linkage 11. The fixing base 13 includes two opposite support portions 131 and a connecting portion connecting the support portions 131. Each support portion 131 defines a curved groove 133 on an outer surface. The curved groove 133 has an opening end 1331 extending outwardly and a receiving end 1332. The central angle between the opening end 1331 and the receiving end 1332 is about 90°. The fixing base 13 defines one or more connecting holes 135, such that the fixing base 13 is fixed to the motherboard.

The control member 14 includes two rotation portions 141 and a connecting portion 142 connecting the rotation portions 141. Each rotation portion 141 is a substantially wedge-shaped plate and defines a first pin hole 1411, a second pin hole 1412, a pivot hole 1413 between the first and second pin holes 1411, 1412, and includes a pivot shaft 1415 received in the pivot hole 1413 to connect the control member 14 and the linkage member 11, a first rotation pin 1416 received in the first pin hole 1411, and a second rotation pin 1417 received in the second pin hole 1412.

The first rotation pin 1416 is slidably received in the curved groove 133, the second rotation pin 1417 is slidably received in the first rear sliding groove 1122 and the second rear sliding groove 1212. Motion paths of the second rotation pin 1417 in the curved groove 133 and the first rotation pin 1416 in the first rear sliding groove 1122 are around different pivot points, such that when the second rotation pin 1417 slides in the curved groove 133, the first rotation pin 1416 is moved along the first rear sliding grove 1122 to move the linkage member 11. In the illustrated embodiment, the curved groove 133 is closer to the pivot shaft 1415 than the motion path of the second rotation pin 1417.

Each fixing pin 15 is received in the first front sliding groove 1121 and the corresponding second front sliding groove 1211.

Assembly of the function modules of the electronic device by the assembly apparatus 100 is as follows. When the control member 14 is rotated about the pivot shaft 1415, the linkage member 11 switches between an engaged state and a disengaged state, thus assembling or disassembling the function modules.

Figure 4:
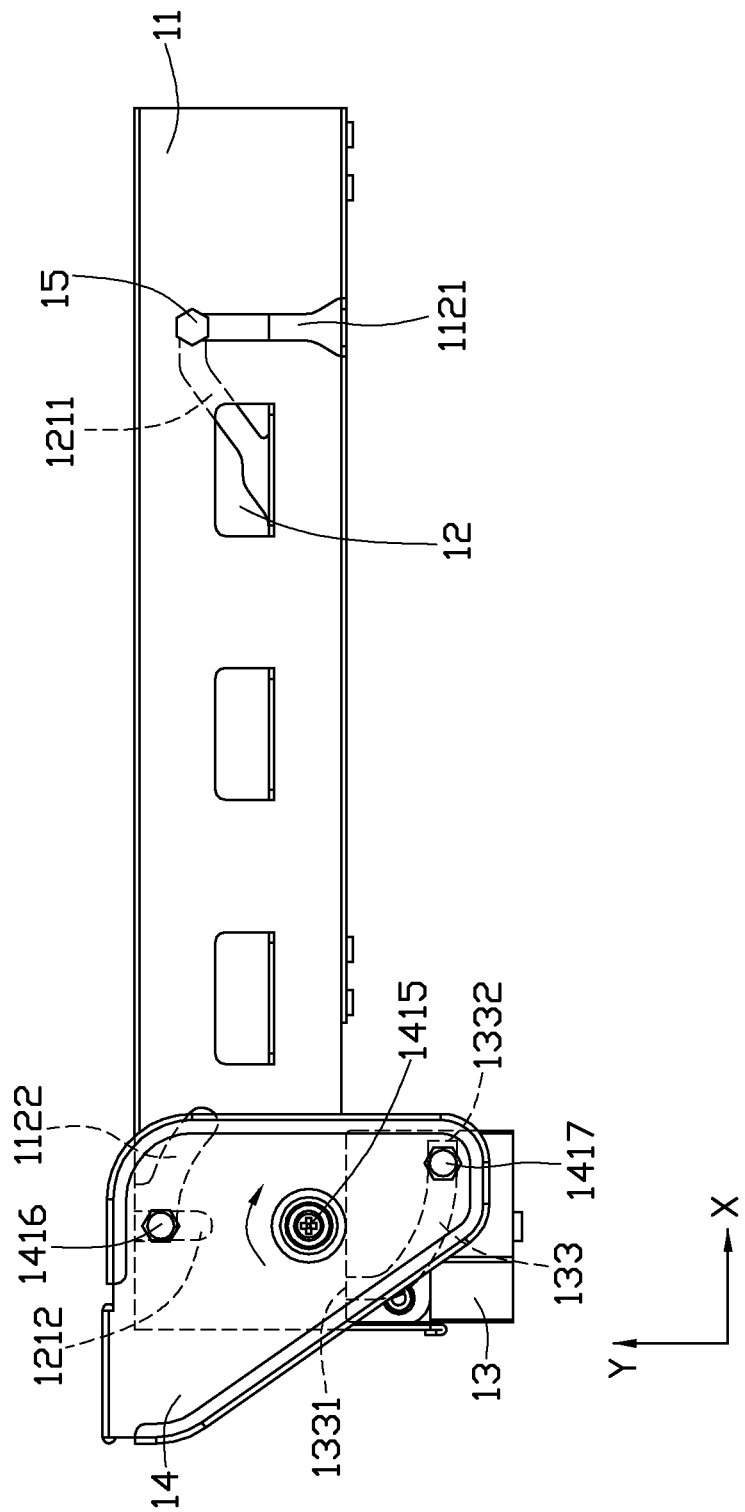
FIG. 4 is a plan view of the assembly apparatus of FIG. 1, in an engaged state.

As shown in FIG. 4, when the assembly apparatus 100 is in an engaged state, the second rotation pin 1417 of the control member 14 is positioned in the receiving end 1332 of the curved groove 133. The first rotation pin 1416 is positioned on the openings of the first rear sliding groove 1122 and the second rear sliding groove 1212. The fixing pin 15 contacts the top portions of the first front sliding groove 1121 and the second front sliding groove 1211. Thereby, the function modules are locked in the current position by the assembly apparatus 100.

To disassemble the function modules, the control member 14 is rotated in the direction indicated by an arrow in FIG. 4, and the first and second rotation pins 1416, 1417 are moved together. The first rotation pin 1416 impels the sliding member 12 toward the linkage along an axis X. Synchronously, the sliding member 12 and the linkage 11 are moved upward along a Y axis via the engagement of the fixing pin 15 and the second front sliding groove 1211. The second rotation pin 1417 is moved outwardly along the curved groove 133. Since the curved groove 133 and the rotation motion path of the second rotation pin 1417 about the pivot shaft 1415 have different centers, and the curved groove 133 is closer to the pivot shaft 1415, when the second rotation pin 1417 slides in the curved groove 133, the rear portion of the linkage member 11 is moved upwardly along a Y axis, via engagement of the first rotation pin 1416 and the first rear sliding groove 1122, thus realizing the translation movement of the linkage member 11. When the second rotation pin 1417 slides out of the opening end 1331 of the curved groove 133, and the fixing pin 15 slides out of the first front sliding groove 1121 and the second front sliding groove 1211, the linkage 11 and the function modules are detached from the fixing base 13.

To assemble the linkage 11, the first rotation pin 1416 is received in the first rear sliding groove 1122 and the second rear sliding groove 1212, and the fixing pin 15 is received in the first front sliding groove 1121 and the second front sliding groove 1211, and the second rotation pin 1417 is received in the curved groove 133. The control member 14 is rotated to move the second rotation pin 1417 to the engaged end 1332 of the curved groove 133 until the assembly apparatus 100 reaches the engaged state.

During the assembly and disassembly process, the linkage member 11 and the function modules received in the linkage member 11 are moved upwardly along Y axis in translational motion, thus preventing the connector connecting the function modules and the motherboard from being damaged.

It is believed that the present embodiments and their advantages will be understood from the foregoing description, and it will be apparent that various changes may be made thereto without departing from the spirit and scope of the disclosure or sacrificing all of its material advantages.

What is claimed is:

1. An assembly apparatus comprising:
    a linkage member movable in a first direction, the linkage member defining a first front sliding groove extending in the first direction and a first rear sliding groove along a curve;
    a sliding member movably connected to the linkage and movable in a second direction substantially perpendicular to the first direction, the sliding member defining a second front sliding groove angled with respect to the first direction and a second rear sliding groove extending in the first direction, wherein the first front sliding groove corresponds to the second front sliding groove, and the first rear sliding groove corresponds to the second rear sliding groove;
    a fixing base defining a curved groove;
    a control member comprising a first rotation pin and a second rotation pin, wherein the control member is pivotally connected to the linkage member, the first rotation pin is slidably received in the first rear sliding groove and the second rear sliding groove, the second rotation pin is slidably received in the curved groove, and motion paths of the second rotation pin in the curved groove and the first rotation pin in the first rear sliding groove are around different pivot points; and
    a fixing pin fixed with respect to the fixing base and slidably received in the first front sliding groove and the second front sliding groove, wherein when the control member is rotated, the first rotation pin impels the sliding member to move in the second direction, and the linkage is moved in the first direction in a translational motion.

2. The assembly apparatus of claim 1, wherein the linkage member comprises two opposite sidewalls and a connecting wall connecting the sidewalls, and the sidewalls and the connecting wall cooperatively define a chamber.

3. The assembly apparatus of claim 2, wherein a plurality of L-shaped support plates are formed on inner sides of the sidewalls, and the support plate and the corresponding sidewall cooperatively define a guide groove for receiving the sliding member.

4. The assembly apparatus of claim 1, wherein the first front sliding groove and the first rear sliding groove extend along different axes.

5. The assembly apparatus of claim 4, wherein the first front sliding groove extends from a bottom of the sidewall in the first direction, and the first rear sliding groove extends from a top of the sidewall in a curve toward the first front sliding groove.

6. The assembly apparatus of claim 4, wherein the second front sliding groove and the second rear sliding groove extend along different axes, the second front sliding groove extends from a bottom of the sliding member and is angled with respect to the first direction, and the second rear groove extends from a top of the sliding member.

7. The assembly apparatus of claim 4, wherein the fixing base comprises two opposite support portions and a connecting portion connecting the support portions, the curved groove is defined on an outer surface of the support portion.

8. The assembly apparatus of claim 7, wherein the curved groove has an opening end extending outwardly and a receiving end, and a central angle between the opening end and the receiving end is about 90°.

9. The assembly apparatus of claim 7, wherein the control member comprises two rotation portions and a connecting portion connecting the rotation portions, each rotation portion defines a first pin hole, a second pin hole, a pivot hole between the first and the second pin holes, and a pivot shaft received in the pivot hole to connect the control member and the linkage member, the first rotation pin is received in the first pin hole, and the second rotation pin is received in the second pin hole.

10. An electronic device comprising:
    a housing;
    a motherboard received in the housing
    one or more function modules electrically connected to the motherboard via a plurality of connectors; and
    an assembly apparatus for mounting the one or more function modules, the assembly apparatus comprising:
        a linkage member movable in a first direction, the linkage member defining a first front sliding groove extending in the first direction and a first rear sliding groove along a curve;
        a sliding member movably connected to the linkage and movable in a second direction substantially perpendicular to the first direction, the sliding member defining a second front sliding groove angled with respect to the first direction and a second rear sliding groove extending in the first direction, wherein the first front sliding groove corresponds to the second front sliding groove, and the first rear sliding groove corresponds to the second rear sliding groove;

a fixing base defining a curved groove and fixed to the motherboard;

a control member comprising a first rotation pin and a second rotation pin, wherein the control member is pivotally connected to the linkage member; the first rotation pin is slidably received in the first rear sliding groove and the second rear sliding groove, the second rotation pin is slidably received in the curved groove, and motion paths of the second rotation pin in the curved groove and the first rotation pin in the first rear sliding groove are around different pivot points; and a fixing pin fixed with respect to the fixing base and slidably received in the first front sliding groove and the second front sliding groove, whereby when the control member is rotated, the first rotation pin impels the sliding member to move in the second direction, and the linkage is moved in the first direction in a translational motion.

11. The electronic device of claim 10, wherein the linkage member comprises two opposite sidewalls and a connecting wall connecting the sidewalls, and the sidewalls and the connecting wall cooperatively define a chamber for receiving the function modules.

12. The electronic device of claim 11, wherein a plurality of L-shaped support plates are formed on inner sides of the sidewalls, and the support plate and the corresponding sidewall cooperatively define a guide groove for receiving the sliding member.

13. The electronic device of claim 10, wherein the first front sliding groove and the first rear sliding groove extend along different axes.

14. The assembly apparatus of claim 13, wherein the first front sliding groove extends from a bottom of the sidewall in the first direction, and the first rear sliding groove extends from a top of the sidewall in a curve toward the first front sliding groove.

15. The assembly apparatus of claim 14, wherein the second front sliding groove and the second rear sliding groove extend along different axes, the second front sliding groove extends from a bottom of the sliding member and is angled with respect to the first direction, and the second rear groove extends from a top of the sliding member.

16. The assembly apparatus of claim 10, wherein the fixing base comprises two opposite support portions and a connecting portion connecting the support portions, and the curved groove is defined on an outer surface of the support portion.

17. The assembly apparatus of claim 16, wherein the curved groove has an opening end extending outwardly and a receiving end, and a central angle between the opening end and the receiving end is about 90°.

18. The assembly apparatus of claim 17, wherein the control member comprises two rotation portions and a connecting portion connecting the rotation portions, each rotation portion defines a first pin hole, a second pin hole, a pivot hole between the first and the second pin holes, and comprises a pivot shaft received in the pivot hole to connect the control member and the linkage member, the first rotation pin is received in the first pin hole, and the second rotation pin is received in the second pin hole.

* * * * *